(12) United States Patent
Masui et al.

(10) Patent No.: US 6,216,742 B1
(45) Date of Patent: Apr. 17, 2001

(54) HEAT INSULATING HOSE

(75) Inventors: Hiroyuki Masui; Toshihiro Nakanishi; Masaru Sato, all of Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/507,083

(22) Filed: Feb. 18, 2000

(30) Foreign Application Priority Data

Feb. 22, 1999 (JP) ................................................ 11-043218

(51) Int. Cl.[7] ........................................................ F16L 11/11
(52) U.S. Cl. ........................... 138/121; 138/149; 138/167
(58) Field of Search ............................... 138/114, 121, 138/149, 167

(56) References Cited

U.S. PATENT DOCUMENTS

| | | | |
|---|---|---|---|
| 2,819,488 | * | 1/1958 | Gimbel ............................... 138/118.1 |
| 3,060,069 | * | 10/1962 | Sindars ................................. 138/121 |
| 3,234,969 | * | 2/1966 | Du Mont .............................. 138/121 |
| 3,374,856 | * | 3/1968 | Wirt .................................... 138/121 |
| 3,453,716 | * | 7/1969 | Cook ................................... 138/149 |
| 3,858,615 | * | 1/1975 | Weigh .................................. 138/121 |
| 4,637,637 | * | 1/1987 | Adorjan ............................... 138/121 |
| 4,712,642 | * | 12/1987 | Lalikos et al. ....................... 138/121 |
| 4,793,384 | * | 12/1988 | Lalikos et al. ....................... 138/121 |
| 4,819,970 | * | 4/1989 | Umehara .............................. 138/121 |
| 5,311,753 | * | 5/1994 | Kanao .................................. 138/121 |
| 5,324,557 | * | 6/1994 | Lupke .................................. 138/121 |
| 5,964,252 | * | 10/1999 | Simmons et al. .................... 138/149 |

* cited by examiner

*Primary Examiner*—James Hook
(74) *Attorney, Agent, or Firm*—McGinn & Gibb, PLLC (57) ABSTRACT

There is provided a heat insulating hose which comprises a seamless cylindrical inner tube formed of a synthetic resin, and a cylindrical heat insulating layer formed of a foamed synthetic resin for covering an outer peripheral face of the inner tube, characterized in that the inner tube is provided at its one end with a cylindrical part for connection with a drain outlet of an air conditioning appliance and formed with a number of ring-shaped protrusion stripes which project toward its outer circumference over an entire length thereof in its axial direction except the cylindrical part spacing a distance W which is wider than an axial width w of each of the ring-shaped protrusion stripes, and that an area b of a desired range spaced by a determined length a from the cylindrical part is an area wherein a number of ring-shaped protrusion stripes are formed at a smaller distance s. Thereby, it is possible to provide a heat insulating hose which can be easily bent at an acute angle for a piping arrangement in a discharging direction such as toward a hole in a wall or the like from a position where it comes out of an air conditioning appliance or the like, and which is not unpleasant in an outer appearance.

20 Claims, 6 Drawing Sheets

HEAT INSULATING HOSE

BACKGROUND OF THE INVENTION

The present invention relates to the structure of a heat insulating hose adapted to be used mainly as an air-conditioner drain hose.

A heat insulating hose having a structure in which a belt material of a foamed synthetic resin cut to have a predetermined width is spirally wound on the outer circumferential surface of an inner tube while the cut surfaces of the belt material are made to abut one another and then a synthetic resin tape is spirally wound on the outer surface of the belt material so as to cover the belt material is generally well known and used as a conventional heat insulating hose. Further, a technique of a heat insulating pipe in which a foamed plastic belt material is put longitudinally on the outer circumferential surface of a straight pipe and rolled into a cylinder and the opposite side edges of the rolled belt material are joined in the axial direction to thereby form a heat insulating coating layer is also proposed as a known technique. Further, an inner tube in the form of a bellows tube which has an annular-shaped portion protruded outwardly in a circumferential direction in order to have flexibility is known.

The well-known heat insulating hose of the former type was not always excellent in productivity because the hose had to be formed while a foamed synthetic resin belt material and a coating tape were wound spirally or while parts of the coating tape were laid to overlap each other and adhesively bonded to each other particularly in the case of the coating tape. On the other hand, the heat insulating pipe of the latter type has a merit that the productivity can be improved because the heat insulating pipe is formed in a manner that a heat insulating material is put along a core pipe longitudinally and the opposite ends of the heat insulating material are joined to each other longitudinally. The latter heat insulating pipe, however, has a problem that the heat insulating pipe is poor in heat insulation because the heat insulating material applied on the inner tube is moved relative to the inner tube so as to be separated from the inner tube easily so that a space is produced between the heat insulating material and the surface of the pipe.

SUMMARY OF THE INVENTION

In view of the above, it is an object of the present invention to improve the above-mentioned heat insulating hose. In particularly, it is an object of the present invention to provide a heat insulating hose which can be easily bent at an acute angle for the piping arrangement from the position outside the air conditioning appliance or the like in a discharging direction such as to a hole in a wall and which can provide a piping condition which is not unpleasant in its outer appearance.

The above-mentioned object can be attained by a heat insulating hose according to the present invention which comprises a seamless cylindrical inner tube formed of a synthetic resin, and a cylindrical heat insulating layer formed of a foamed synthetic resin for covering an outer peripheral face of the inner tube. The inner tube is provided at its one end with a cylindrical part for connection with a drain outlet of an air conditioning appliance. The inner tube is formed with a number of ring-shaped protrusion stripes which project toward its outer circumference over an entire length thereof in its axial direction except the cylindrical part. The adjacent ring-shaped protrusion stripes are spaced by a distance W which is wider than an axial width w of each of the ring-shaped protrusion stripes. The inner tube has an area b of a desired range spaced by a determined length a from the cylindrical part which is an area wherein a number of ring-shaped protrusion stripes are formed at smaller distances.

In putting the invention in practice, it is preferable that an axial width ws of the smaller distance s in the area b of the inner tube is substantially the same as an axial width wa of each of the ring-shaped protrusion stripes in said area b.

In addition, it is preferable that the inner tube is provided with at its longitudinal other end with a cylindrical connecting part which has an outer diameter insertable in the cylindrical connecting part.

Further, it is preferable that the heat insulating layer is formed in a tubular shape by cutting the foamed synthetic resin material in a shape of a strip and bonding its longitudinal side edges to each other.

Furthermore, it is advantageous that the foamed material constituting the heat insulating layer is a closed cell foamed material.

Moreover, it is preferable that an area p of a desired range in the heat insulating layer corresponding to the area b of the inner tube is of a structure that a number of annular grooves d are formed at a smaller distance.

In addition, it is preferable that an outer peripheral face of the heat insulating layer is covered with an outer covering layer in a shape of a synthetic resin film.

As material of the inner tube for forming the heat insulating hose according to the invention, an appropriate synthetic resin material such as polyolefin resin including polyethylene (PE), polypropylene (PP), etc. or polyvinyl chloride resin (PVC) can be used. The foamed synthetic resin material composing the heat insulating layer is preferably a closed cell foamed material in order to prevent an intrusion of water and enhance the heat insulating efficiency. Further, at the bent portion of the hose, the heat insulating layer may be embossed or provided with minute asperities so that wrinkles or bending pleats generated on a surface of the heat insulating layer may not be distinguishable.

BRIEF DESCRIPTION OF THE PREFERRED EMBODIMENTS

DETAILED DESCRIPTION OF THE PREFERABLE EMBODIMENTS

In order to solve the aforementioned problem in the conventional heat insulating hose, it is desirable to provide a heat insulating hose in which a heat insulating material is rolled and its opposite ends are joined to each other longitudinally so that the heat insulating material is formed like a cylinder in advance and then the cylindrical heat insulating material is fitted onto an inner tube so that not only the productivity can be improved but also the fitting state of the heat insulating material relative to the inner tube is secured sufficiently such that the heat insulating material can be bent smoothly without obstructing the bending properties of the hose while the heat insulating effect can be kept sufficiently.

Figure 6:
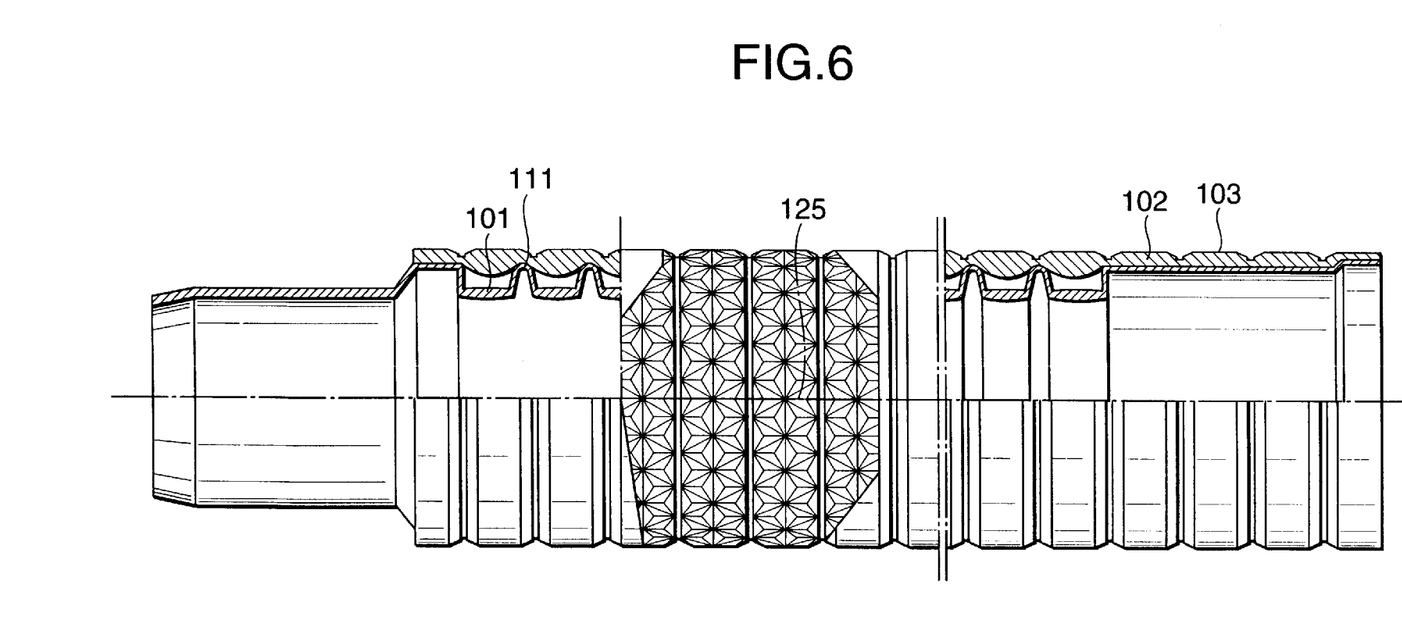
FIG. 6 is a cross sectional view of the heat insulating hose according to the related art.

Through the inventors' tireless research and development, it has been found that the foregoing preference can be achieved by the heat insulating hose which comprises a seamless and flexible inner tube 101 made of a synthetic resin, and a cylindrical heat insulating layer 102 made of a foamed synthetic resin covering an outer circumferential surface of the inner tube, as shown in FIG. 6. The inner tube 1 includes a large number of ring-shaped protrusive stripes 111. Each of the ring-shaped protrusive stripes 111 has a circular arc-shaped apical portion making an acute angle between inclined surfaces on opposite sides in an axially sectional shape. The ring-shaped protrusive stripes 111 are formed at intervals of a distance larger than the longitudinal width of each of the ring-shaped protrusive stripes. The heat insulating layer 102 is formed to have a seam 125 in a state in which a foamed synthetic resin sheet cut so as to be into a belt-like shape is rolled into a cylinder and side edge portions of the foamed synthetic resin sheet are made to abut on each other and joined together longitudinally. The cylindrical heat insulating layer 102 has an inner diameter being set so as to be smaller than the maximum diameter of the ring-shaped protrusive stripes of the inner tube. The inner tube is covered with the heat insulating layer in a state in which the apical portions of the ring-shaped protrusive stripes enter the heat insulating layer.

Thus, the heat insulating hose of the described structure has such remarkable advantages that its productivity is enhanced, an engagement between both the inner tube and the heat insulating material is fully ensured to maintain a sufficient heat insulating effect, whereby a heat insulating hose can be obtained at a low cost, because almost the whole inner tube is in a shape of an accordion hose having ring-shaped protrusion stripes projecting annularly toward an outer circumference thereof to impart flexibility to the inner tube itself, and a heat insulating cylindrical body is separately formed of a cut strip of a heat insulating material which is round in a tubular shape for covering an outer peripheral face of the inner tube.

On the other hand, through the inventors' further tireless research and development, the inventors have found that, with the heat insulating hose of the type which is directly attached to a drain outlet of the air conditioning appliance or the like, in case where the drain hose inserted into and connected to the drain outlet of the air conditioning appliance or the like is largely curved toward a hole in a wall or the like in a discharging direction from a position where it comes out of the air conditioning appliance or the like, it provides an unpleasant outer appearance. Therefore, it is necessary to bend the hose at an acute angle for piping arrangement, but the above-mentioned hose had no such flexibility as can be arranged at such an acute angle.

In view of the above the present invention is made to provide a heat insulating hose which can be easily bent at an acute angle for the piping arrangement from the position outside the air conditioning appliance or the like in a discharging direction such as to a hole in a wall and which can obtain such a piping condition as is not unpleasant in its outer appearance.

Figure 1:
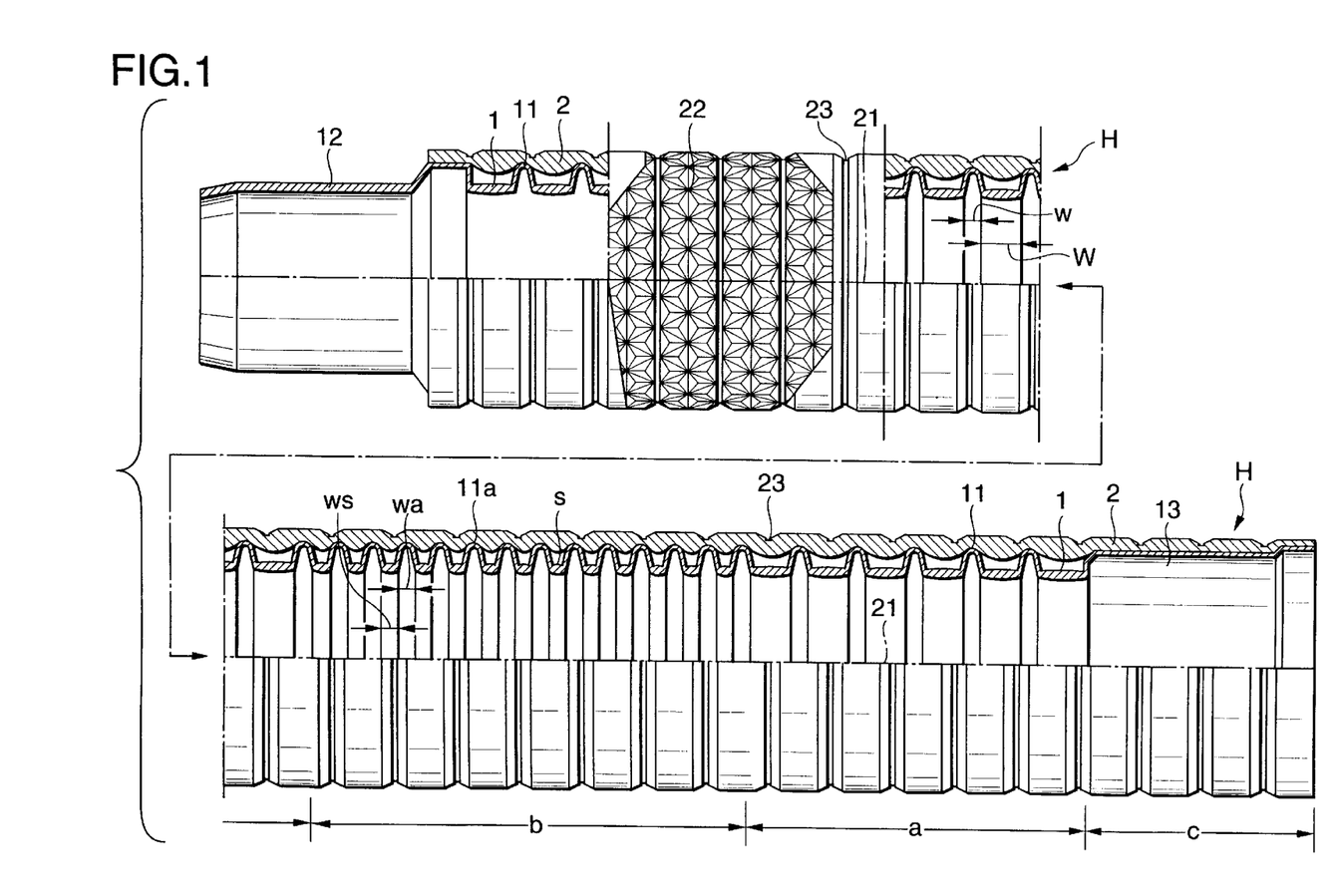
FIG. 1 is a front view in a partial section showing a first embodiment of the invention.
Figure 2:
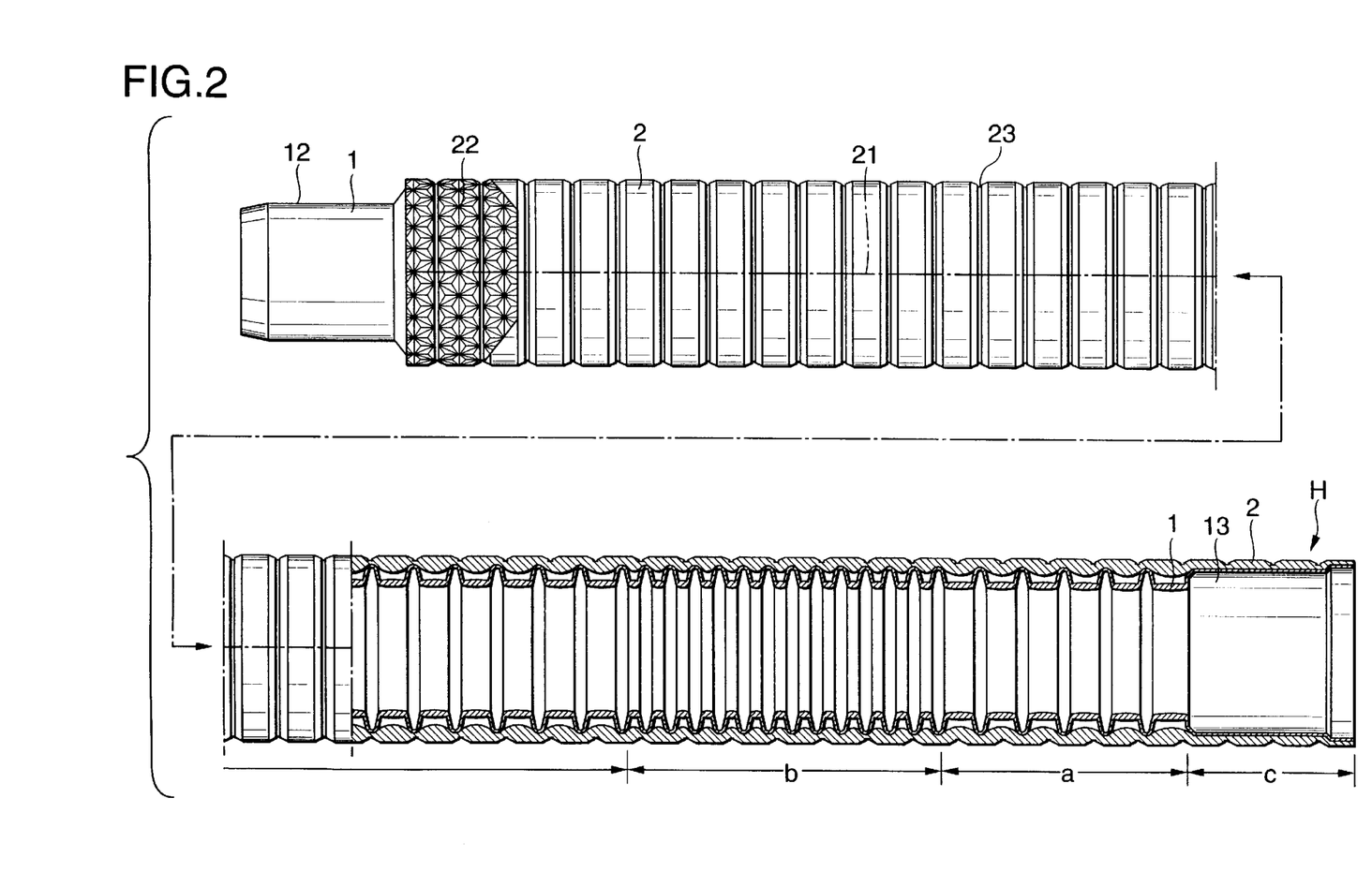
FIG. 2 is a front view of FIG. 1 in a partially longitudinal section.
Figure 3:
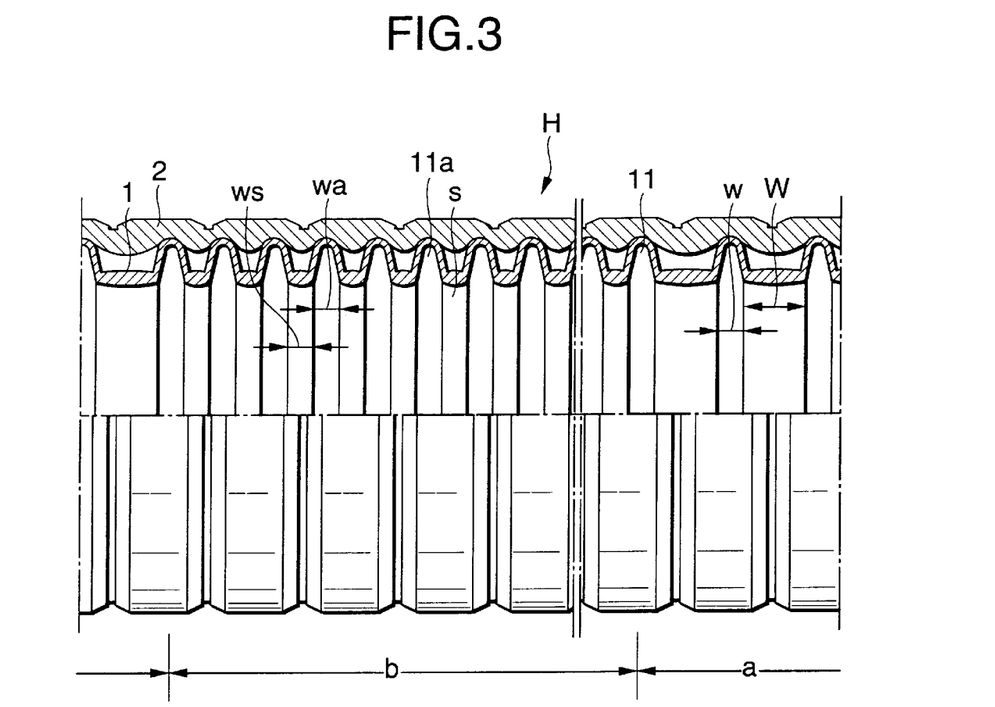
FIG. 3 is an enlarged explanatory view of an essential part of FIG. 1.

Now, hereinafter embodiments of the invention will be described referring to the drawings. In the drawings, FIGS. 1 to 3 show a heat insulating hose according to a first embodiment of the invention. FIG. 1 is a front view in a partial section showing a pipe wall configuration of the hose with mainly its upper half cut away, FIG. 2 is a front view of the hose in a partially longitudinal section with a part of the hose cut away longitudinally, and FIG. 3 is an explanatory view of an essential part of the hose showing a pipe wall part in an enlarged scale.

The heat insulating hose H illustrated as the first embodiment is a hose including an inner tube 1 formed of a synthetic resin and a heat insulating layer 2 formed of a foamed synthetic resin material. The inner tube 1 shown in the drawings is formed of a PP resin and provided with a number of ring-shaped protrusion stripes 11 substantially over the whole length of the pipe body at an appropriate distance W in a pipe axial direction. The inner tube 1 is an integrally formed tubular body which can be easily bent and deformed in an appropriate manner by means of a number of these ring-shaped protrusion stripes 11. The appropriate distance W in the pipe axial direction herein referred to is substantially twice as large as a width w of each of the ring-shaped protrusion stripes 11 in the pipe axial direction. On the other hand, as shown in the lower right end of FIG. 1, one end of the inner tube 1 is formed with a cylindrical part 13 of a female type for connection with the drain outlet (outside the drawings) of the air conditioning appliance, for example, by fitting over the drain outlet. Further, the inner tube 1 as shown in the embodiment is also integrally formed with a cylindrical part 12 of a male type for connection as seen in the upper left end of FIG. 1.

Moreover, in the inner tube 1 as shown in the embodiment, in an area b having a desired range interposing a determined length a following a length c of the cylindrical part 13 of the female type for connection with the appliance, the ring-shaped protrusion stripes 11 are formed closer to each other than in the other areas. In other words, each of a number of the ring-shaped protrusion stripes 11a in this area b has a width wa in its pipe axial direction which is substantially the same as the width w of the ring-shaped protrusion stripe 11 in the pipe axial direction in the other areas, and a smaller protruding distance s is defined. A distance ws of this small distance s in the pipe axial direction is made substantially as large as the width wa of the ring-shaped protrusion stripe 11a in the pipe axial direction. By making the protruding distance of the ring-shaped protrusion stripes 11a smaller in this way, only this area b is of such a structure as can be more easily bent than the other areas.

The heat insulating layer 2 is formed in a tubular shape by rounding a foamed synthetic resin material of a closed cell foam which is cut in a strip of a desired width so that longitudinal side edges 21 of the strip are abutted to each other, and by bonding the abutted side edges to each other by heat welding. Reference numeral 23 in the drawings designates annular grooves formed on an outer peripheral face of the heat insulating layer 2. The above described inner tube 1 is inserted into the cylindrical body formed of the heat insulating material in a tubular shape in this way from its open end and thereby to form a double pipe.

The heat insulating layer 2 as shown in this embodiment is provided with a pattern 22 of minute asperities on the outer surface thereof as seen in FIGS. 1 and 2. The pattern 22 has been made by passing the above described foamed synthetic resin material which is cut in a strip of a desired width to make the heat insulating cylindrical body through heated working rollers provided with an appropriate emboss pattern on its surface before it is formed into the tubular shape. By previously making the pattern on the surface of the heat insulating layer 2 in this way, wrinkles and bending pleats which are generated at a bent and shrinked side of the hose when the hose is packed or bent to pipe will not be distinguishable, and beauty in the appearance of the whole hose can be increased and maintained.

Approximate sizes of the hose H as illustrated in the embodiment are exemplified as follows; An inner diameter of the inner tube 1 is about 14 mm, a maximum diameter of the ring-shaped protrusion stripe 11 is about 20 mm, an inner diameter of the heat insulating layer 2 when the inner tube 1 is not inserted is about 18 mm and an outer diameter thereof is about 27 mm. The length c of the cylindrical part 13 for connection with the appliance is about 25 mm, the distance of the area a following the cylindrical part 13 is about 25 mm, length of the area b of a desired range with the ring-shaped protrusion stripes 11a formed closer is about 50 mm, and the protruding distance of the ring-shaped protrusion stripes 11a is about 3 mm.

Figure 4:
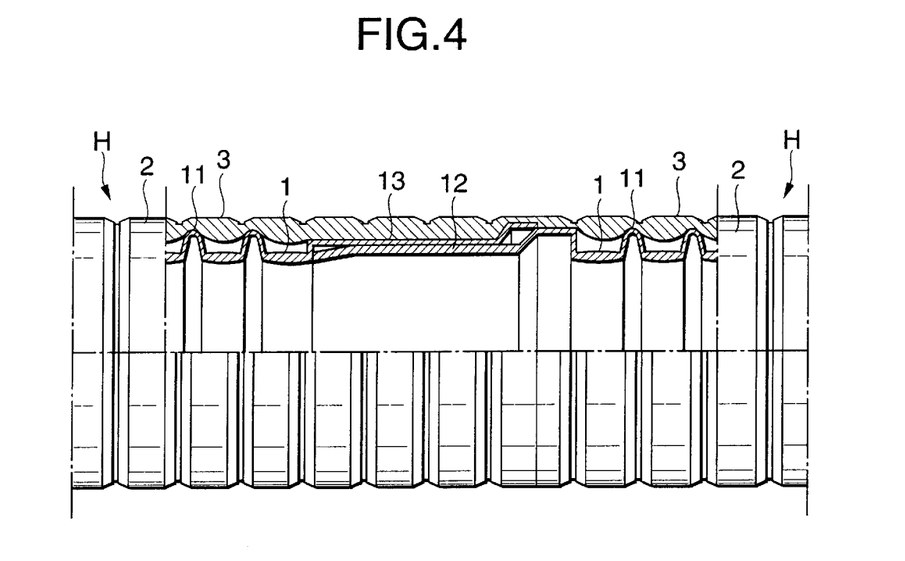
FIG. 4 is a view explaining two hoses in a connected state showing a second embodiment.

FIG. 4 shows a structure of a second embodiment. A heat insulating hose H as shown in this embodiment employs a foamed material provided with an outer covering layer 3 which is formed by bonding a PE resin film having a thickness of about 100 μm to the surface of the closed cell foamed material constituting the heat insulating layer by pressing with heat in order to strengthen weather resistance and to prevent aging change of the heat insulating material, thereby to form a cylindrical body as in the above described first embodiment in which the heat insulating layer 2 provided with the outer covering layer 3 is formed.

Further, the heat insulating hose H as shown in this embodiment is of a structure that an inner diameter of the cylindrical connecting part 13 of the female type of the inner tube 1 which is formed at the right end of the left hand hose H in FIG. 4 is substantially the same as an outer diameter of the cylindrical connecting part 12 of the male type of the inner tube 1 which is formed at the left end of the right hand hose H. The cylindrical connecting part 13 of the left hand hose H and the cylindrical connecting part 12 of the right hand hose H herein described may be realized as the cylindrical connecting part 13 and the cylindrical connecting part 12 formed at both ends of a single hose H. Moreover, these cylindrical connecting part 13 and the cylindrical connecting part 12 may have a space therebetween by interposing an annular packing or the like.

Figure 5:
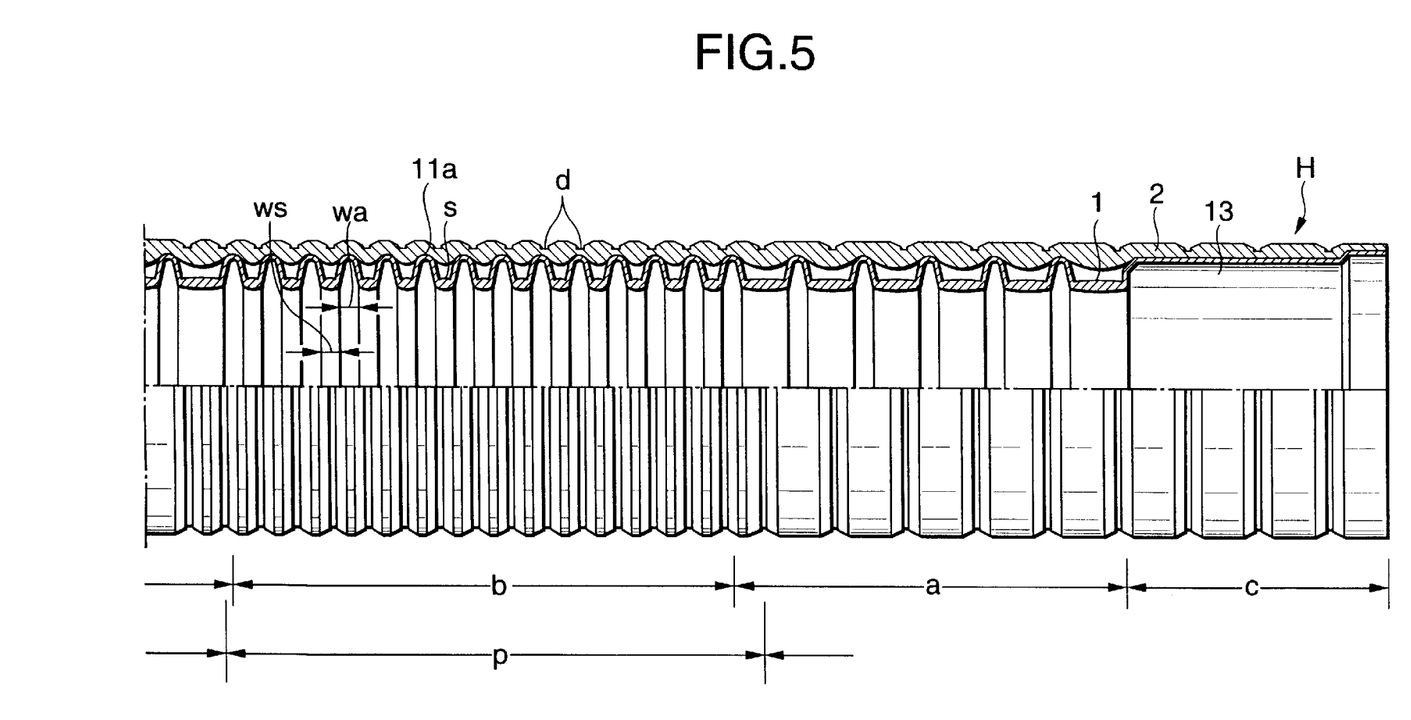
FIG. 5 is a front view in a partial section showing a third embodiment.

FIG. 5 shows a third embodiment of the invention. The heat insulating hose H herein illustrated is of a structure that in an area p of a desired range in the heat insulating layer 2 corresponding to the area b of the inner tube 1 in the first embodiment wherein the ring-shaped protrusion stripes 11a are protrudingly formed closer, there are formed a number of annular grooves d at an outer peripheral face of the area p. With this structure, the flexibility of the inner tube 1 at the area b will not be hindered, but can be rather enhanced. This embodiment is similar to the first embodiment in the other respects.

Those embodiments which can be considered as typical ones of the invention have been heretofore described, but the invention is not necessarily restricted to these embodiments. The invention can be put in practice appropriately modifying within a scope wherein the above described constituting elements of the invention are provided, the objects of the invention can be achieved and the following effects are fulfilled.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As apparent from the foregoing description, the heat insulating hose according to the invention is of the structure that it comprises a seamless cylindrical inner tube 1 formed of a synthetic resin, and a cylindrical heat insulating layer 2 formed of a foamed synthetic resin for covering an outer peripheral face of the inner tube, characterized in that the inner tube is provided at its one end with a cylindrical part for connection with a drain outlet of an air conditioning appliance and formed with a number of ring-shaped protrusion stripes which project toward its outer circumference over an entire length thereof in its axial direction except the cylindrical part spacing a distance W which is wider than an axial width w of each of the ring-shaped protrusion stripes, and that an area b of a desired range spaced by a determined length a from the cylindrical part is an area wherein a number of ring-shaped protrusion stripes are formed at a smaller distance s. Accordingly, the hose can be easily bent at the acute angle for the piping arrangement from the position where it comes out of the air conditioning appliance or the like in the discharging direction such as toward the hole in the wall. Therefore, there will be no such fears that the hose may be largely curved unnecessarily at this position to give an ugly outer appearance or the hose is bent at too of an angle to generate a buckling phenomenon or to damage the hose. The invention can attain such remarkable effects that the hose can be bent beautifully in the outer appearance for the piping arrangement as the conventional hose would not have attained.

What is claimed is:

1. A heat insulating hose comprising:

a seamless cylindrical inner tube formed of a synthetic resin; and a cylindrical heat insulating layer formed of a foamed synthetic resin for covering an outer peripheral face of the inner tube, wherein said inner tube is provided at its one end in an axial direction thereof with a cylindrical part for connection with a drain outlet of an air conditioning appliance and is formed with a number of ring-shaped protrusion stripes which project toward its outer circumference over an entire length thereof in the axial direction except said cylindrical part, said ring-shaped protrusion stripes adjacent said cylindrical part being spaced at a first predetermined distance W which is wider than an axial width w of each of said ring-shaped protrusion stripes, and wherein said inner tube has an area b of a desired range spaced by a determined length a from said cylindrical part, said area being an area where a part of said ring-shaped protrusion stripes are formed to arrange adjacent ring-shaped protrusion stripes at a second predetermined distance s smaller than said first predetermined distance W, wherein said ring-shaped protrusion stripes adjacent said cylindrical part comprise a first continuous pattern and said ring-shaped protrusion stripes of said area b comprise a second continuous pattern.

2. The heat insulating hose according to claim 1, wherein an axial width ws of said second predetermined distance s in said area b of the inner tube is substantially the same as an axial width wa of each of said ring-shaped protrusion stripes in said area b.

3. The heat insulating hose according to claim 2, wherein said inner tube is provided at its other end in the axial direction thereof with a cylindrical connecting part which has an outer diameter insertible in said cylindrical connecting part.

4. The heat insulating hose according to claim 1, wherein said inner tube is provided at its other end in the axial direction thereof with a cylindrical connecting part which has an outer diameter insertible in said cylindrical connecting part.

5. The heat insulating hose according to claim 1, wherein said heat insulating layer is formed into a tubular shape by cutting a foamed synthetic resin material in a shape of a strip and then connecting its longitudinal side edges to each other.

6. The heat insulating hose according to claim 5, wherein an outer peripheral face of said heat insulating layer is covered with an outer covering layer in a shape of a synthetic resin film.

7. The heat insulating hose according to claim 5, wherein said foamed synthetic resin material constituting said heat insulating layer comprises a closed cell foamed material.

8. The heat insulating hose according to claim 7, wherein an outer peripheral face of said heat insulating layer is covered with an outer covering layer in a shape of a synthetic resin film.

9. The heat insulating hose according to claim 1, wherein an outer peripheral face of said heat insulating layer is covered with an outer covering layer in a shape of a synthetic resin film.

10. The heat insulating hose according to claim 1, wherein said synthetic resin forming said inner tube comprises one of a polyvinyl chloride resin (PVC) and polyolefin resin, said polyolefin resin comprising one or more of a group consisting of at least polyethylene (PE) and polypropylene (PP).

11. The heat insulating hose according to claim 10, wherein said inner tube is formed of said polypropylene, wherein said inner tube comprises an integrally formed tubular body which is maximally bendable and deformable at said area b, and wherein said distance W is twice as large as said axial width w of each of said ring-shaped protrusion stripes in the pipe axial direction.

12. The heat insulating hose according to claim 1, wherein said cylindrical heat insulating layer comprises a pattern of minute asperities on an outer surface.

13. The heat insulating hose according to claim 1, wherein said foamed synthetic resin for covering said outer peripheral face of the inner tube comprises an outer covering layer, said layer formed by bonding a polyethylene (PE) resin film having a thickness of 100 $\mu$m to the surface of said foamed synthetic resin.

14. The heat insulating hose according to claim 1, wherein a protruding distance of said ring-shaped protrusion stripes has a predetermined small dimension such that said area b is more easily bendable than other areas of said hose.

15. A heat insulating hose comprising:

a seamless cylindrical inner tube formed of a synthetic resin; and a cylindrical heat insulating layer formed of a foamed synthetic resin for covering an outer peripheral face of the inner tube, wherein said inner tube is provided at its one end in an axial direction thereof with a cylindrical part for connection with a drain outlet of an air conditioning appliance and is formed with a number of ring-shaped protrusion stripes which project toward its outer circumference over an entire length thereof in the axial direction except said cylindrical part, said ring-shaped protrusion stripes being spaced at a first predetermined distance W which is wider than an axial width w of each of said ring-shaped protrusion stripes, wherein said inner tube has an area b of a desired range spaced by a determined length a from said cylindrical part, said area being an area where a part of said ring-shaped protrusion stripes are formed to arrange adjacent ring-shaped protrusion stripes at a second predetermined distance s smaller than said first predetermined distance W, wherein said heat insulating layer corresponding to said adjacent ring-shaped protrusion stripes spaced at the first predetermined distance W has a structure that a number of annular grooves are formed while adjacent annular grooves are spaced at a third predetermined distance, and wherein an area p of a desired range in said heat insulating layer corresponding to said area b of said inner tube has a structure that a number of annular grooves d are formed while adjacent annular grooves are spaced at a fourth predetermined distance which is smaller than the third predetermined distance.

16. The heat insulating hose according to claim 15, wherein an outer peripheral face of said heat insulating layer is covered with an outer covering layer in a shape of a synthetic resin film.

17. A heat insulating hose comprising:

a seamless cylindrical inner tube formed of a synthetic resin; and a cylindrical heat insulating layer formed of a foamed synthetic resin for covering an outer peripheral face of the inner tube, wherein said inner tube is provided at its one end in an axial direction thereof with a cylindrical part for connection with a drain outlet of an air conditioning appliance and is formed with a number of ring-shaped protrusion stripes which project toward its outer circumference over an entire length thereof in the axial direction except said cylindrical part, said ring-shaped protrusion stripes being spaced at a first predetermined distance W which is wider than an axial width w of each of said ring-shaped protrusion stripes, wherein said inner tube has an area b of a desired range spaced by a determined length a from said cylindrical part, said area being an area where a part of said ring-shaped protrusion stripes are formed to arrange adjacent ring-shaped protrusion stripes at a second predetermined distance s smaller than said first predetermined distance W, wherein said heat insulating layer is formed into a tubular shape by cutting a foamed synthetic resin material in a shape of a strip and then connecting its longitudinal side edges to each other, wherein said heat insulating layer corresponding to said adjacent ring-shaped protrusion stripes spaced at the first predetermined distance W has a structure that a number of annular grooves are formed while adjacent annular grooves are spaced at a third predetermined distance, and wherein an area D of a desired range in said heat insulating layer corresponding to said area b of said inner tube has a structure that a number of annular grooves d are formed while adjacent annular grooves are spaced at a fourth predetermined distance which is smaller than the third predetermined distance.

18. The heat insulating hose according to claim 17, wherein an outer peripheral face of said heat insulating layer is covered with an outer covering layer in a shape of a synthetic resin film.

19. A heat insulating hose comprising:

a seamless cylindrical inner tube formed of a synthetic resin; and a cylindrical heat insulating layer formed of a foamed synthetic resin for covering an outer peripheral face of the inner tube, wherein said inner tube is provided at its one end in an axial direction thereof with a cylindrical part for connection with a drain outlet of an air conditioning appliance and is formed with a number of ring-shaped protrusion stripes which project toward its outer circumference over an entire length thereof in the axial direction except said cylindrical part, said ring-shaped protrusion stripes being spaced at a first predetermined distance W which is wider than an axial width w of each of said ring-shaped protrusion stripes, wherein said inner tube has an area b of a desired range spaced by a determined length a from said cylindrical part, said area being an area where a part of said ring-shaped protrusion stripes are formed to arrange adjacent ring-shaped protrusion stripes at a second predetermined distance s smaller than said first predetermined distance W, wherein said heat insulating layer is formed into a tubular shape by cutting a foamed synthetic resin material in a shape of a strip and then connecting its longitudinal side edges to each other, wherein said foamed synthetic resin material constituting said heat insulating layer comprises a closed cell foamed material, wherein said heat insulating layer corresponding to said adjacent ring-shaped protrusion stripes spaced at the first predetermined distance W has a structure that a number of annular grooves are formed while adjacent annular grooves are spaced at a third predetermined distance, and wherein an area p of a desired range in said heat insulating layer corresponding to said area b of said inner tube has a structure that a number of annular grooves d are formed while adjacent annular grooves are spaced at a fourth predetermined distance which is smaller than the third predetermined distance.

20. The heat insulating hose according to claim 19, wherein an outer peripheral face of said heat insulating layer is covered with an outer covering layer in a shape of a synthetic resin film.

* * * * *